United States Patent
Schneider

(10) Patent No.: US 8,556,740 B1
(45) Date of Patent: Oct. 15, 2013

(54) PORTABLE SANDBOX

(76) Inventor: Darla G. Schneider, Barling, AR (US)

(*) Notice: Subject to any disclaimer, the term of this patent is extended or adjusted under 35 U.S.C. 154(b) by 297 days.

(21) Appl. No.: 12/973,970

(22) Filed: Dec. 21, 2010

(51) Int. Cl.
*A63G 31/00* (2006.01)
*A63H 33/32* (2006.01)

(52) U.S. Cl.
USPC ............................. 472/126; 446/70; 446/465

(58) Field of Classification Search
USPC ............ 472/126; 446/70, 431, 450, 465, 470, 446/471; 47/65.5, 39, 47.34, 47.36, 47.371; 280/47.25, 87.01, 639
See application file for complete search history.

(56) References Cited

U.S. PATENT DOCUMENTS

| | | | | |
|---|---|---|---|---|
| 2,724,123 A | * | 11/1955 | Kesler | 4/513 |
| 3,220,773 A | * | 11/1965 | Burns | 297/440.1 |
| 5,141,241 A | * | 8/1992 | Avila | 280/47.371 |
| 5,407,218 A | * | 4/1995 | Jackson | 280/30 |
| 5,957,482 A | | 9/1999 | Shorter | |
| 6,128,853 A | | 10/2000 | Klonel et al. | |
| 6,616,539 B1 | | 9/2003 | Gatto et al. | |
| 7,036,270 B1 | | 5/2006 | Shepherd | |
| 7,159,358 B2 | * | 1/2007 | Yawney et al. | 47/65.5 |
| 2003/0084610 A1 | | 5/2003 | Yawney et al. | |
| 2008/0096679 A1 | | 4/2008 | Stengel | |

* cited by examiner

*Primary Examiner* — Kien Nguyen
(74) *Attorney, Agent, or Firm* — Montgomery Patent & Design; Robert C. Montgomery

(57) ABSTRACT

A portable sandbox comprises a modular sandbox assembly and a plurality of wheels. The sandbox assembly comprises a durable, waterproof open-top box structure, a flat lid, a plurality of attachable handles, and the like. A bottom surface of the box structure comprises the plurality of wheels for transportation along a ground surface. In a preferred embodiment, the box further comprises a drainage hole to allow for use as a planter.

14 Claims, 5 Drawing Sheets

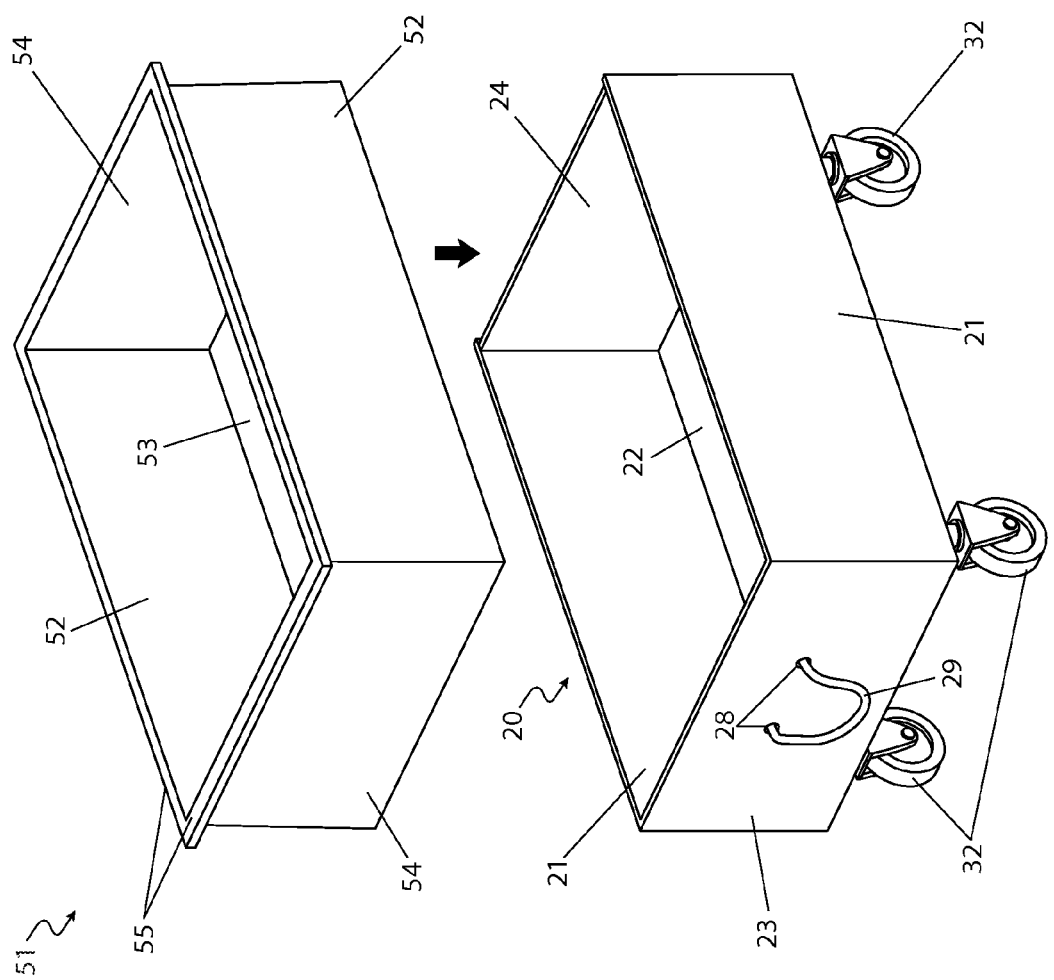

PORTABLE SANDBOX

RELATED APPLICATIONS

The present invention was first described in a notarized Official Record of Invention on Apr. 2, 2010, that is on file at the offices of Montgomery Patent and Design, LLC, the entire disclosures of which are incorporated herein by reference.

FIELD OF THE INVENTION

The present invention relates generally to recreational sandboxes, and in particular, to a coverable and transportable recreational sandbox.

BACKGROUND OF THE INVENTION

Sandboxes are popular recreational fixtures for children. The sand provides a unique textural experience for children while providing additional possibilities for creation and entertainment due to the moldable nature of sand. Sandboxes further encourage children to spend extended periods within the enclosure which can simplify and expedite the responsibilities of a caretaker.

Due to the messy nature of sandboxes and, more specifically, the sand itself, sandboxes are generally found in outdoor settings. Moreover, due to the difficulty of transporting, removing, and replacing sand, such fixtures are generally permanent in nature and the sand in them is rarely replaced. As a result, both the structure and the contained sand are subject to a range of weather and environmental conditions.

Factors such as rain and sun can degrade the quality of the sandbox structure itself as well as the sand. For instance, after a heavy rain, the sand may contain a high percentage of rain which renders it unsuitable for play. Wind, water, and wildlife may deposit unsavory chemicals, materials or objects in the sand which can make it unsanitary and otherwise unsafe for small children.

Another problem associated with sandbox is that of their removal after a prolonged period of installation. Should a person desire to remove a sandbox from permanent installation within their yard, for example after a child has grown up, the portion of the yard on which the sandbox was previously installed is generally devoid of grass or plant growth and difficult to rehabilitate.

Various attempts have been made to provide sandboxes with additional provisions for protection or alternate use. Examples of these attempts can be seen by reference to several U.S. patents and U.S. patent applications. U.S. Patent Application No. 2008/0096679, issued in the name of Stengel, describes a sandbox located within a top surface of a desk type furniture structure. The Stengel apparatus includes a basin for receiving sand and a removable cover which allows the top surface of the apparatus to be utilized as a desk.

U.S. Pat. No. 6,616,539, issued in the name of Gatto et al., describes a covered sandbox with a disengaging hinge including sand and water basins configurable in a number of opened and closed positions.

While these apparatuses fulfill their respective, particular objectives, each of these references suffer from one (1) or more of the aforementioned disadvantages. Many such apparatuses are not readily transportable, which aggravates plant growth in the location of installation and does not allow storage and protection from weather conditions. Also, many such apparatuses are not protected from environmental conditions such as sunlight and precipitation when disposed outdoors for use. In addition, many such apparatuses are difficult to drain and clean thoroughly. Accordingly, there exists a need for a sandbox without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a sandbox which is readily transportable, which can be protected from environmental conditions, and which is simple to prepare, drain, and clean. Thus, the object of the present invention is to solve the aforementioned disadvantages and provide for this need.

To achieve the above objectives, it is an object of the present invention to comprise a portable sandbox for storing and transporting play sand, soil, or a similar substance utilized for recreational purposes. The apparatus comprises an open-top rectangular basin including a pair of side panels, a bottom panel, an end panel, and a tailgate.

Another object of the present invention is to facilitate transportation of the apparatus in a manner which is simple and non-damaging to a ground surface. The apparatus comprises a plurality of wheels disposed along a bottom surface of the bottom panel and a basin handle attached to the end panel.

Yet still another object of the present invention is to allow a user to enclose the apparatus to prohibit undesired weather, sunlight, and other environmental conditions from ruining substances, objects or plants located within the basin. The apparatus comprises a lid which covers the open top of the basin. The lid comprises a pair of lid handles to facilitate placement and removal.

Yet still another object of the present invention is to enable water or other fluid to drain from the basin via a drainage aperture disposed within the bottom panel. The drainage aperture can be selectively sealed using a plug.

Yet still another object of the present invention is to facilitate access to the internal portion of the basin via the tailgate for purposes of cleaning, loading, or the like. The tailgate comprises a hinge along a bottom edge which enables the tailgate to pivot downwardly and expose the internal portion of the basin. The apparatus further comprises a pair of securing means located on opposing lateral perimeter edges of the tailgate which allow a user to secure the tailgate in an upright position.

Yet still another object of the present invention is to provide an additional means of retaining sand or the like within the basin by comprising an insertable basin which is removably insertable within the basin. The insertable basin comprises a similar open-topped rectangular shape corresponding to the internal portion of the basin.

Yet still another object of the present invention is to provide a method of utilizing the device that provides a unique means of obtaining an instance of the apparatus, depositing desired substances or objects within the basin, towing the apparatus to a desired location with the basin handle and wheels, positioning the tailgate in a deployed position as desired, securing the tailgate in an upright position as desired using the securing means, draining the basin by removing the plug from the drainage aperture, positioning the lid on the upper surface of the basin as desired, inserting the insertable basin into the basin as desired, and utilizing the apparatus in a desired location in a temporary fashion to facilitate recreational activities.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
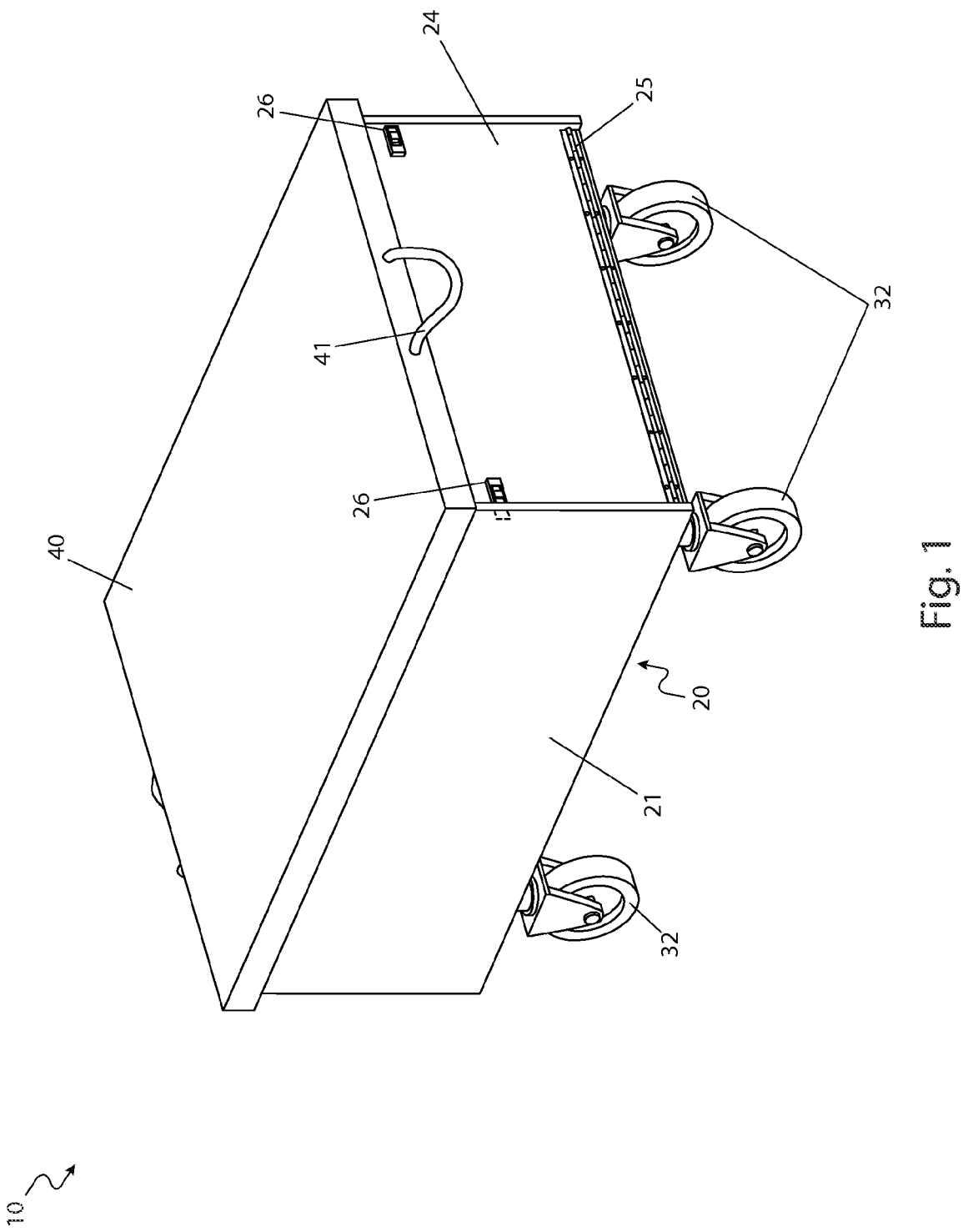
FIG. 1 is a perspective view of a portable sandbox 10, according to a preferred embodiment of the present invention.

DESCRIPTIVE KEY 10 portable sandbox
20 basin
21 side panel
22 bottom panel
23 end panel
24 tailgate
25 hinge
26 securing means
27 slot
28 end panel aperture
29 basin handle
30 drainage aperture
31 plug
32 wheel
40 lid
41 lid handle
51 insertable basin
52 insertable basin side panel
53 insertable basin bottom panel
54 insertable basin end panel
55 ledge

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a portable sandbox (herein described as the "apparatus") 10, which provides a means for storing and transporting sand, dirt, or similar substance. The apparatus 10 is utilized with common play sand, potting soil, or the similar substance which may be utilized by children or adults for enjoyment. The apparatus 10 may be utilized indoors and outdoors as desired and is easily towed to the desired location. The apparatus 10 may also be fully enclosed to prohibit undesired weather patterns from destroying items and plants within and prohibiting sunlight from heating the apparatus 10 to undesired temperatures.

Referring now to FIG. 1, a perspective view of the apparatus 10, according to the preferred embodiment of the present invention, is disclosed. The apparatus 10 comprises an open-top rectangular basin 20 which provides a means to retain sand, soil, or the like. The basin 20 includes features such as a pair of side panels 21, a bottom panel 22, an end panel 23, and a tailgate 24. The basin 20 also includes a plurality of wheels 32 which provide a transporting means to the apparatus 10 (also see FIG. 2). The apparatus 10 also comprises a lid 40 which provides a covering means to an internal portion of the basin 20. The basin 20 measures approximately two (2) feet by three (3) feet, yet other dimensions may be utilized without limiting the scope of the apparatus 10. The basin 20 and lid 40 are preferably fabricated from materials such as, but not limited to: plastic, wood, or the like.

Figure 2:
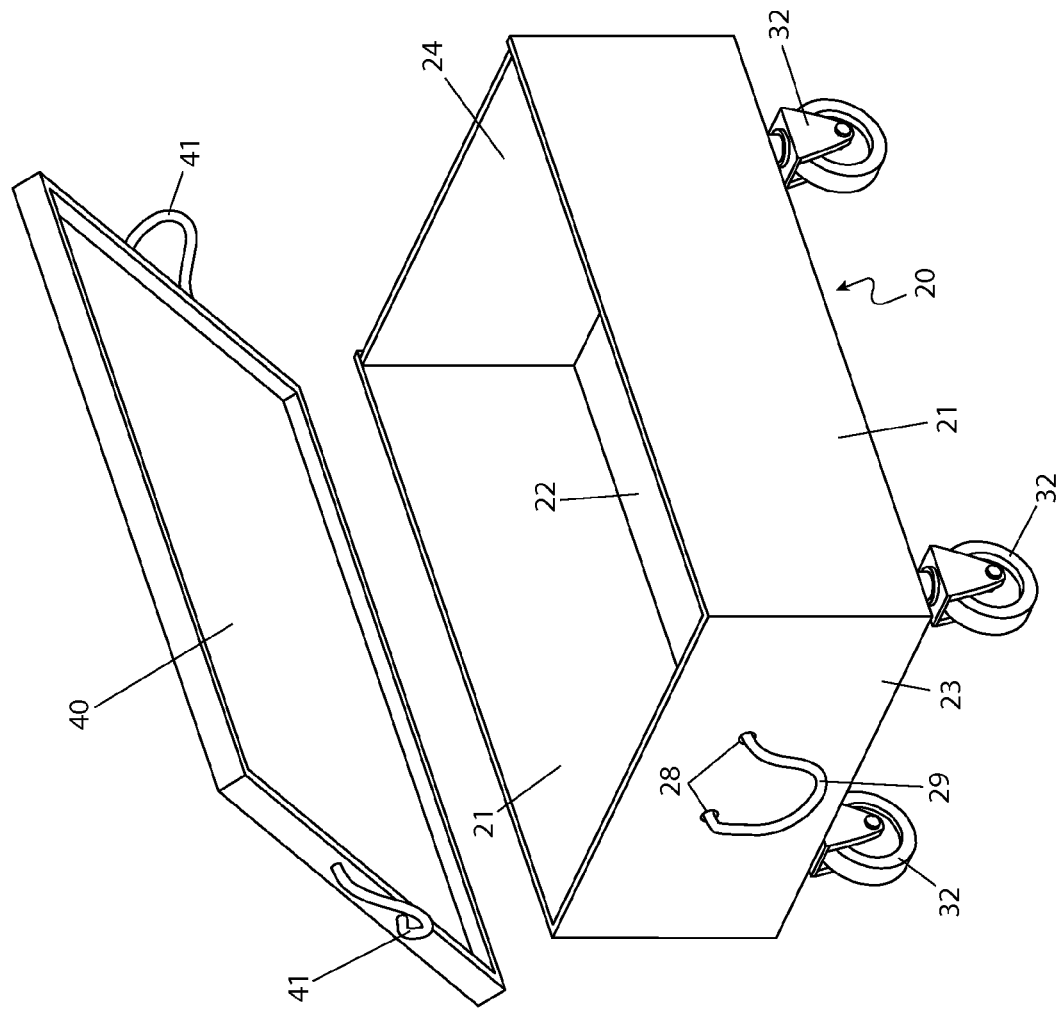
FIG. 2 is an opposing perspective view of the portable sandbox 10 depicting a removed lid 40, according to a preferred embodiment of the present invention.

Referring now to FIG. 2, an opposing perspective view of the apparatus 10 depicting a removed lid 40, according to the preferred embodiment of the present invention, is disclosed. The end panel 23 of the basin 20 comprises a pair of end panel apertures 28 which provide an opening to insert and secure a basin handle 29. The basin handle 29 is utilized for towing the basin 20 about the wheels 32 (see herein below). The basin handle 29 is depicted as being located on the end panel 23 for illustration purposes only; it is known that other locations may be utilized without limiting the scope of the apparatus 10. The basin handle 29 is preferably a nylon rope routed through each end panel aperture 28 to an internal portion of the end panel 23 and secured via common knotting (see FIG. 3), yet other devices and attachment means may be utilized without limiting the scope of the apparatus 10.

The wheels 32 enable the apparatus 10 to be towed to a desired location. The wheels 32 also enable the apparatus 10 to eliminate damage to grassy surfaces or the like via its mobility. The wheels 32 are attached to a lower surface of the bottom panel 22 at each corner edge. The wheels 32 are preferably lockable caster-type wheels comprising a treaded tire for traction purposes. The wheels 32 are an appropriate diameter to tow the basin 20 and retain the desired weight within said basin 20. The wheels 32 are attached to the bottom panel 22 via attachment means such as, but not limited to: mechanical fasteners, integral molding, or the like.

The lid 40 is positioned upon an upper perimeter edge of the side panels 21, end panel 23, and tailgate 24 and provides a concealing means to the interior of the basin 20. The lid 40 is depicted as comprising a rectangular-shape for illustration purposes only; it is known that other shapes may be utilized without limiting the scope of the apparatus 10. The lid 40 comprises slightly larger dimensions than the basin 20 to enable said lid 40 to lay in a manner which prohibits the undesirable from entering said basin 20 such as rain. The lid 40 comprises a pair of lid handles 41 which are located upon outer side surfaces of said lid 40, yet other locations may be utilized without limiting the scope of the apparatus 10. The lid handles 41 are preferably integrally molded "U"-shaped gripping devices which enable a user to remove said lid 40 as desired.

Figure 3:
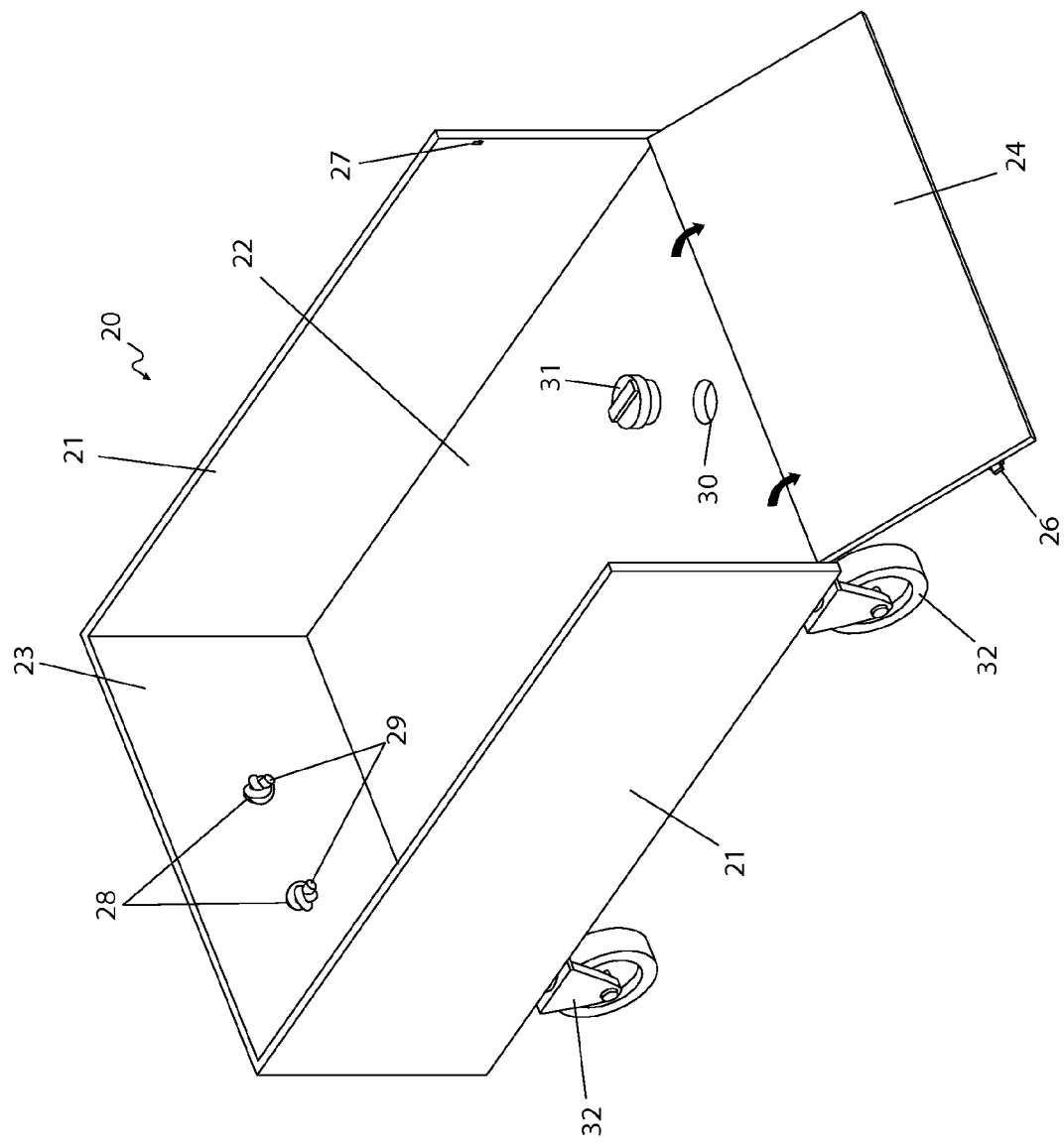
FIG. 3 is another perspective view of the portable sandbox 10 depicting an open tailgate 24, according to a preferred embodiment of the present invention.
Figure 4:
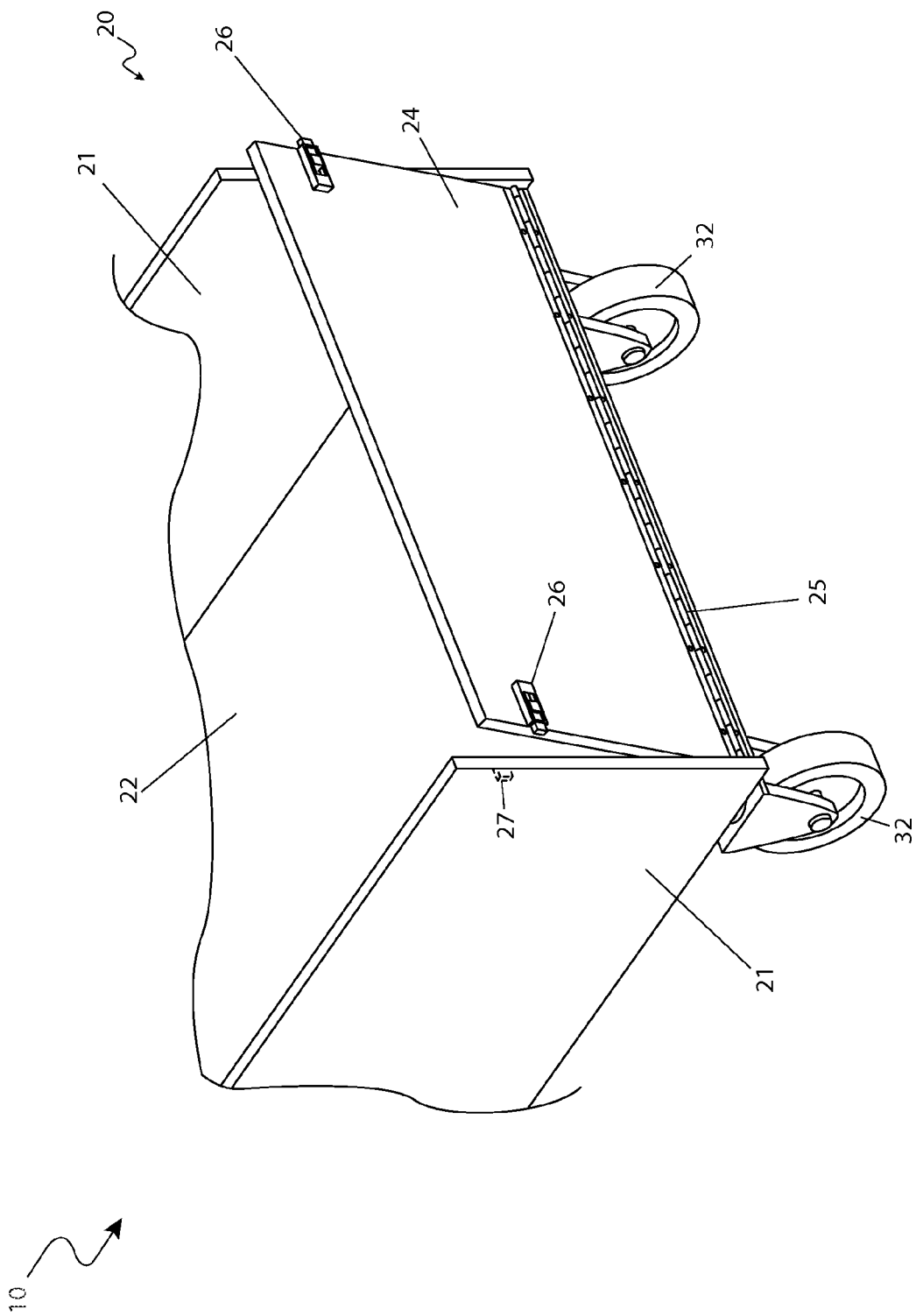
FIG. 4 is a close-up perspective view of the tailgate 24, according to a preferred embodiment of the present invention; and, FIG. 5 is a perspective view of an insertable basin 51, according to an accessory to the preferred embodiment of the present invention.

Referring now to FIG. 3, another perspective view of the apparatus 10 depicting an open tailgate 24 and FIG. 4, a close-up perspective view of the tailgate 24, according to the preferred embodiment of the present invention, are disclosed. The bottom panel 22 comprises a drainage aperture 30 which provides an outlet to enable water or other fluid to drain from the basin 20. The drainage aperture 30 preferably comprises a plug 31 which may be inserted into said drainage aperture 30 to obstruct the flow of fluids. The plug 31 may be inserted into the drainage aperture 30 via interference fitting means, threading means, or the like. The plug 31 is preferably fabricated from plastic, rubber, or the like and is an appropriate diameter to seal the drainage aperture 30.

The tailgate 24 provides a means to access the internal portion of the basin 20 for purposes such as, but not limited to: cleaning, loading, or the like. The tailgate 24 opposes the end panel 23 and is hingedly attached to the bottom panel 22. The tailgate 24 comprises a hinge 25 which enables said tailgate 24 to pivot downwardly. The hinge 25 is attached via mechanical fasteners such as screws to a perimeter edge of the bottom panel 22 and a lower perimeter edge of the tailgate 24. The tailgate 24 is secured in an upright manner (see FIG. 1) via a pair of opposing securing means 26. The securing means 26 are located on opposing lateral perimeter edges of an outer surface of the tailgate 24 and are preferably comprised of a spring-loaded normally extended device which engage respective slots 27 (also see FIG. 3); yet other locking means may be utilized without limiting the scope of the apparatus 10. The securing means 26 are attached to the outer surface via integral molding or mechanical fasteners. The slots 27 are located on opposing inner surfaces of each side panel 21 and provide an indentation for the securing means 26 to engage and secure the tailgate 24 in an upright manner to the side panels 21.

Referring now to FIG. 5, a perspective view of an insertable basin 51, usable as an accessory to the preferred embodiment of the present invention, is disclosed. The apparatus 10 may also comprise an insertable basin 51 which may be inserted within the basin 20 and provide an additional means of retaining sand or the like. The insertable basin 51 includes an open-topped rectangular shape which comprises a pair of insertable basin side panels 52, an insertable basin bottom panel 53, and a pair of insertable basin end panels 54. The insertable basin 51 is placed into the basin 20 and filled with a desired substance. An outer surface of the insertable basin bottom panel 53 is placed upon an inner surface of the bottom panel 22 which enables inners surfaces of the side panels 21, end panel 23, and tailgate 24 to make contact with outer surfaces of the insertable basin side panels 52 and insertable basin end panels 54, respectively. An upper ledge 55 also makes contact with the upper perimeter edge of the basin 20.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: acquiring the apparatus 10; positioning the apparatus 10 on a level surface with the wheels 32 in contact with said level surface; depositing a desired substance within the basin 20; towing the basin 20 to a desired location via grasping and pulling the basin handle 29; positioning the tailgate 24 in a deployed position via disengaging the securing means 26 with the slots 27 and downwardly pivoting said tailgate 24 via the hinge 25; removing the plug 31 from the drainage aperture 30 as desired; positioning the tailgate 24 in an upright manner via engaging the securing means 26 with the slots 27 and upwardly pivoting the tailgate 24 via the hinge 25; positioning the lid 40 onto an upper surface of the basin 20 as desired; inserting the insertable basin 51 into the basin 20 as desired; and; allowing for longer periods of play and protection of children and associated outdoor areas in a manner which is quick, easy, and effective.

Additionally, an insertable basin 51 may be inserted into the within the basin 20 via engaging the outer surface of the insertable basin bottom panel 53 with an inner surface of the bottom panel 22 which enables the inners surfaces of the side panels 21, end panel 23, and tailgate 24 to engage the outer surfaces of the insertable basin side panels 52 and insertable basin end panels 54, respectively; and, the upper ledge 55 also engages the upper perimeter edge of the basin 20.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A portable sandbox for storing and transporting sand, said portable sandbox comprising:
   an open-top basin capable of retaining sand therein, said open-top basin including:
      a plurality of side panels;
      a bottom panel attached to said side panels; and,
      an end panel attached to said side panels; and,
   a plurality of wheels attached to said bottom panel;
   wherein said end panel includes a plurality of end panel apertures and a basin handle routed through each of said end panel apertures respectively;
   a tailgate oppositely located to said end panel and pivotally attached to said bottom panel, said tailgate including:
      a hinge attached to a perimeter edge of said bottom panel and a lower perimeter edge of said tailgate respectively, and,
      a plurality of spring-loaded devices located on opposing lateral perimeter edges of an outer surface of said tailgate, said spring-loaded devices being engaged with said slots respectively;
   wherein said tailgate is secured in an upright manner to said side panels via said spring-loaded devices.

2. The portable sandbox of claim 1, further comprising: an insertable basin removably seated within said open-top basin, said insertable basin including:
   a plurality of insertable basin side panels;
   an insertable basin bottom panel;

a plurality of insertable basin end panels; and, an upper ledge contacting an upper perimeter edge of said open-top basin;

wherein an outer surface of said insertable basin bottom panel contacts an inner surface of said open-end basin bottom panel.

3. The portable sandbox of claim 1, further comprising: a lid removably positioned over said basin, wherein said lid is removably positioned upon an upper perimeter edge of said side panels, said end panel, and said tailgate respectively;

wherein said lid includes a plurality of U-shaped lid handles located upon an outer side surface of said lid.

4. The portable sandbox of claim 1, wherein said basin handle is a rope.

5. The portable sandbox of claim 1, wherein said wheels are respectively attached to corner edges of said bottom panel.

6. The portable sandbox of claim 1, wherein said bottom panel comprises:

a drainage aperture; and, a plug removably interfitted within said drainage panel.

7. The portable sandbox of claim 1, wherein said side panels have slots located on opposing inner surfaces thereof respectively.

8. A portable sandbox for storing and transporting sand, said portable sandbox comprising:

an open-top basin capable of retaining sand therein, said open-top basin including:

a plurality of planar side panels;

a planar bottom panel attached to said side panels; and, a planar end panel attached to said side panels; and, a plurality of wheels attached to said bottom panel;

wherein said end panel includes a plurality of end panel apertures and a basin handle routed through each of said end panel apertures respectively;

an insertable basin removably seated within said open-top basin, said insertable basin including:

a plurality of insertable basin side panels;

an insertable basin bottom panel;

a plurality of insertable basin end panels; and, an upper ledge contacting an upper perimeter edge of said open-top basin;

wherein an outer surface of said insertable basin bottom panel contacts an inner surface of said open-end basin bottom panel.

9. The portable sandbox of claim 8, further comprising: a tailgate oppositely located to said end panel and pivotally attached to said bottom panel, said tailgate including:

a hinge attached to a perimeter edge of said bottom panel and a lower perimeter edge of said tailgate respectively, and, a plurality of spring-loaded devices located on opposing lateral perimeter edges of an outer surface of said tailgate, said spring-loaded devices being engaged with said slots respectively;

wherein said tailgate is secured in an upright manner to said side panels via said spring-loaded devices.

10. The portable sandbox of claim 9, further comprising: a lid removably positioned over said basin, wherein said lid is removably positioned upon an upper perimeter edge of said side panels, said end panel, and said tailgate respectively;

wherein said lid includes a plurality of U-shaped lid handles located upon an outer side surface of said lid.

11. The portable sandbox of claim 8, wherein said basin handle is a rope.

12. The portable sandbox of claim 8, wherein said wheels are respectively attached to corner edges of said bottom panel.

13. The portable sandbox of claim 8, wherein said bottom panel comprises:

a drainage aperture; and, a plug removably interfitted within said drainage panel.

14. The portable sandbox of claim 8, wherein said side panels have slots located on opposing inner surfaces thereof respectively.

* * * * *